(12) United States Patent
Sharma et al.

(10) Patent No.: US 11,159,610 B2
(45) Date of Patent: Oct. 26, 2021

(54) CLUSTER FORMATION OFFLOAD USING REMOTE ACCESS CONTROLLER GROUP MANAGER

(71) Applicant: DELL PRODUCTS L.P., Round Rock, TX (US)

(72) Inventors: Anurag Sharma, Cedar Park, TX (US); Elie Antoun Jreij, Pflugerville, TX (US); Marcelo Daniel Vinante, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/598,626

(22) Filed: Oct. 10, 2019

(65) Prior Publication Data
US 2021/0112118 A1   Apr. 15, 2021

(51) Int. Cl.
| | |
|---|---|
| G06F 15/173 | (2006.01) |
| H04L 29/08 | (2006.01) |
| G06F 8/65 | (2018.01) |
| G06F 9/451 | (2018.01) |
| H04L 12/24 | (2006.01) |
| G06F 3/0482 | (2013.01) |
| G06F 1/3203 | (2019.01) |

(52) U.S. Cl.
CPC ............ *H04L 67/1046* (2013.01); *G06F 8/65* (2013.01); *G06F 9/451* (2018.02); *H04L 41/082* (2013.01); *H04L 41/22* (2013.01); *H04L 67/1097* (2013.01); *G06F 1/3203* (2013.01); *G06F 3/0482* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,318,107 B1* | 1/2008 | Menon | ............... | G06F 11/2025 |
| | | | | 700/82 |
| 7,516,181 B1* | 4/2009 | Du | ..................... | H04L 67/1008 |
| | | | | 709/205 |
| 7,631,107 B2 | 12/2009 | Pandya | | |
| 7,685,254 B2 | 3/2010 | Pandya | | |
| 7,797,404 B1* | 9/2010 | Knight | ............... | H04L 41/0806 |
| | | | | 709/220 |

(Continued)

FOREIGN PATENT DOCUMENTS

| | | |
|---|---|---|
| WO | 2003104943 | 12/2003 |
| WO | 2019010049 | 1/2019 |

*Primary Examiner* — Anthony Mejia
(74) *Attorney, Agent, or Firm* — Jackson Walker LLP; Christopher J. Rourk

(57) ABSTRACT

A system for processor configuration comprising a processor that includes a plurality of algorithmic controls stored in memory and configured to cause the processor to perform predetermined functions. A remote access controller coupled to the processor and configured to communicate over a communications medium and to send and receive controls and data to a remote device. Wherein the remote access controller is further configured to detect one or more server groups over the communications medium and to generate a prompt on a user interface device of the remote access controller to allow a user to select a control for the processor to be configured to join one of the server groups when the processor transitions from a power off state to a power on state.

19 Claims, 4 Drawing Sheets

(56) References Cited

U.S. PATENT DOCUMENTS

| | | | | |
|---|---|---|---|---|
| 7,885,994 B2* | 2/2011 | Lavanya | | G06F 9/5083 |
| | | | | 709/201 |
| 8,595,714 B1* | 11/2013 | Hamer | | G06F 8/65 |
| | | | | 717/170 |
| 8,745,503 B2* | 6/2014 | Jaquot | | G11B 19/025 |
| | | | | 715/736 |
| 8,996,652 B2 | 3/2015 | Kataria et al. | | |
| 9,071,537 B2 | 6/2015 | Talla et al. | | |
| 9,713,003 B2* | 7/2017 | Kim | | H04W 4/70 |
| 10,079,839 B1* | 9/2018 | Bryan | | G05B 15/02 |
| 10,339,791 B2* | 7/2019 | Baum | | G08B 25/08 |
| 10,454,997 B2* | 10/2019 | Martz | | H04L 12/2825 |
| 2002/0129128 A1* | 9/2002 | Gold | | G06F 9/44505 |
| | | | | 709/220 |
| 2004/0162870 A1* | 8/2004 | Matsuzaki | | H04L 67/101 |
| | | | | 709/200 |
| 2005/0033794 A1* | 2/2005 | Aridor | | H04L 67/42 |
| | | | | 709/200 |
| 2005/0071837 A1* | 3/2005 | Butt | | G06F 8/65 |
| | | | | 717/168 |
| 2005/0108381 A1* | 5/2005 | Hunt | | H04L 41/0659 |
| | | | | 709/223 |
| 2005/0108518 A1 | 5/2005 | Pandya | | |
| 2006/0075101 A1* | 4/2006 | Anerousis | | H04L 67/1008 |
| | | | | 709/225 |
| 2006/0242453 A1* | 10/2006 | Kumar | | G06F 11/0709 |
| | | | | 714/4.1 |
| 2007/0041386 A1* | 2/2007 | Mar | | H04L 67/1095 |
| | | | | 370/395.52 |
| 2007/0124343 A1* | 5/2007 | Velayudham | | G06F 9/542 |
| 2008/0052699 A1* | 2/2008 | Baker | | G06F 8/63 |
| | | | | 717/168 |
| 2009/0049166 A1* | 2/2009 | Roman | | H04L 67/34 |
| | | | | 709/223 |
| 2010/0005142 A1* | 1/2010 | Xiao | | H04L 67/24 |
| | | | | 709/204 |
| 2013/0205292 A1* | 8/2013 | Levijarvi | | G06F 8/61 |
| | | | | 717/177 |
| 2013/0205293 A1* | 8/2013 | Levijarvi | | H04L 67/34 |
| | | | | 717/177 |
| 2013/0242805 A1* | 9/2013 | Jung | | H04W 4/50 |
| | | | | 370/255 |
| 2014/0019549 A1* | 1/2014 | Wei | | H04M 3/567 |
| | | | | 709/204 |
| 2014/0040448 A1* | 2/2014 | Cheng | | H04L 41/50 |
| | | | | 709/223 |
| 2014/0143401 A1* | 5/2014 | Carlen | | G06F 11/2043 |
| | | | | 709/223 |
| 2014/0167928 A1* | 6/2014 | Burd | | G06F 11/2007 |
| | | | | 340/12.5 |
| 2015/0089376 A1* | 3/2015 | Slapp, III | | H04L 5/0078 |
| | | | | 715/738 |
| 2015/0324126 A1 | 11/2015 | Nakajima | | |
| 2017/0078283 A1* | 3/2017 | Unagami | | H04L 63/065 |
| 2017/0114618 A1* | 4/2017 | Fladmark | | G06F 11/2007 |
| 2018/0189046 A1* | 7/2018 | Kunisetty | | H04L 41/082 |
| 2019/0042407 A1 | 2/2019 | Gao et al. | | |
| 2019/0332369 A1* | 10/2019 | Gupta | | G06F 8/65 |
| 2019/0349426 A1 | 11/2019 | Smith et al. | | |
| 2020/0036621 A1* | 1/2020 | Veeraraghavan | | H04L 43/50 |
| 2020/0249938 A1* | 8/2020 | Shin | | G06F 8/71 |
| 2020/0351150 A1* | 11/2020 | Sethi | | G06F 11/3048 |

* cited by examiner

FIGURE 3    300

CLUSTER FORMATION OFFLOAD USING REMOTE ACCESS CONTROLLER GROUP MANAGER

TECHNICAL FIELD

The present disclosure relates generally to computer networks, and more specifically to a system and method for server cluster formation offload using a remote access controller group manager.

BACKGROUND OF THE INVENTION

Configuring a new server in a data center to join a computing cluster is a labor intensive process and is prone to user error.

SUMMARY OF THE INVENTION

A system for processor configuration is disclosed that includes a processor that has a plurality of algorithmic controls stored in memory and configured to cause the processor to perform predetermined functions. A remote access controller is connected to the processor and is configured to communicate over a communications medium and to send and receive controls and data to a remote device. The remote access controller is further configured to detect one or more server groups over the communications medium and to generate a prompt on a user interface device of the remote access controller to allow a user to select a control for the processor to be configured to join one of the server groups when the processor transitions from a power off state to a power on state.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
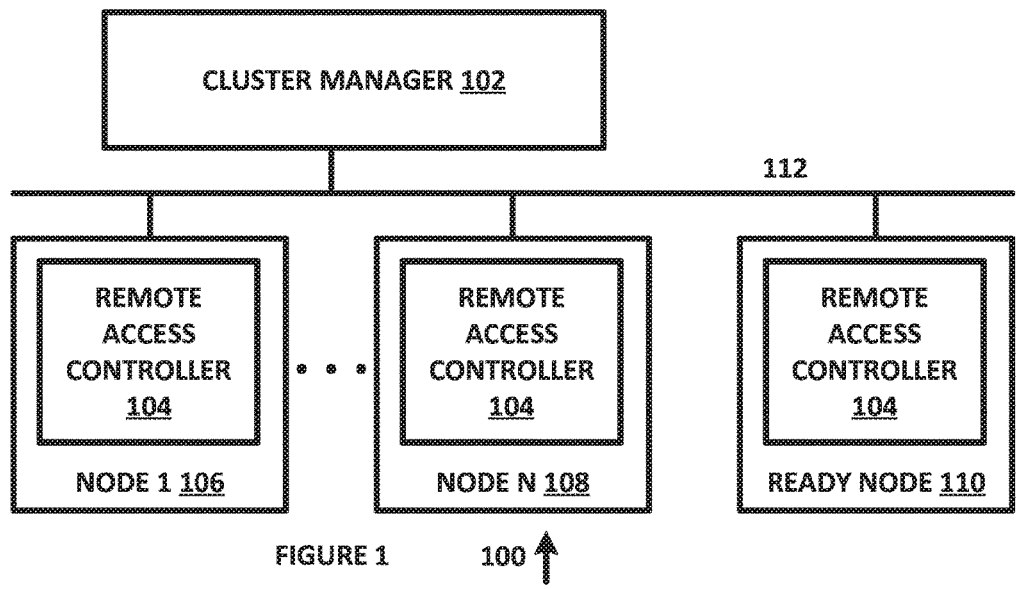
FIG. 1 is a diagram of a system for providing cluster formation offload using a remote access controller group manager, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Networked computer systems include servers that are specialized processors that are used to provide services to other processors that may be referred to as members, nodes or in other manners. Multiple servers that provide a common or related service can be referred to as a "cluster," and can have an associated cluster manager that is used to coordinate the operations of the servers in the cluster. When a new server is added to an existing cluster of servers, a specific workflow is typically used that may include the use of a server bezel liquid crystal diode (LCD) screen for the new server to select functions for joining a cluster, creating a new cluster, adding a new node or performing other similar functions.

One drawback with such workflows is that they typically require multiple steps to be performed by the user and also by different associated software systems, and can also require multiple reboots when the platform is initially installed. For example, it is common for the following steps to be required: 1) verify the signature of a new server (also referred to as a "ready node") based on device or system settings, 2) update the host operating system (OS) on the ready node and reboot, 3) update the solution level agent running on the host OS, 4) create an inventory of the hardware (HW) and firmware (FW) of all components on the ready node, 5) compare and update the FW versions on the ready node to match with the cluster version, 6) go through additional reboots associated with these or other processes, including a final reboot of the ready node, and 7) the ready node joins the cluster.

The present disclosure simplifies this process and reduces the number of steps required for ready nodes to join a cluster. The present disclosure uses a solution cluster, which is an engineered solution that requires a minimum of a predetermined number of nodes (such as three or more) to form the solution cluster. These nodes are typically clustered using a process that can include turning on applications such as cluster manager to complete the initial configuration.

As mentioned, a ready node can refer to a new node that is pre-configured at a manufacturing center to include HW and FW that matches with a solution cluster HW and SW stack. These ready nodes are thus pre-configured and validated for the specific solution cluster.

A remote access controller (RAC) group manager can be used to provide a simplified basic management of the RAC of each server on the same local network. The RAC group manager can be used to provide a one-to-many console experience without involving a separate application. In one example embodiment, an RAC group manager can allow a user to view the details of a set of servers by permitting more powerful management than by inspecting servers visually for faults and other manual methods.

The present disclosure associates clusters with RAC group manager groups, such as by using the same names for cluster names and group names. When a new node is installed, it does not need to be powered on before a user can select what cluster the server should be added to, and instead, once power cable is connected, the RAC can be enabled, can check for available groups, and can list them on the ready node LCD screen. The user can use the LCD buttons to scroll through available clusters (which have the same names as RAC groups). If the user does not want to use the same names for clusters and groups, then the RAC can provide a mapping table between group names and cluster names. Once all hosts of a cluster form an RAC group, the solution cluster manager maps the RAC group name to the solution cluster name.

Administrators in a data center typically do not have full access to a solution cluster manager, and instead prefer to rely on the server LCD to complete any last-minute steps, like joining a ready node to the existing cluster. The present disclosure provides a solution for cluster expansion that allows an administrator to configure a ready node from the LCD of the ready node, and which can be controlled by RAC.

Once a ready node has been powered-on after being installed in a data center, the RAC of the ready node is configured to automatically discover the available RAC groups and to generate a prompt that includes the group names in the server bezel LCD screen of the ready node, to allow a user to select the cluster to join. The RAC of the ready node is configured to send a request to RAC group manager to join a cluster in response to a selection of the cluster by a user. The solution cluster manager is configured to monitor the RAC group manager to detect change in the group. When a new node is detected, the solution cluster manager can initiate the process of cluster expansion.

The present disclosure offloads node discovery responsibility to RAC, instead of requiring the ready node to perform the node discovery function using an application that requires the operating system of the ready node. This configuration is applicable to virtualized and non-virtualized ready nodes, and is also independent of the specific functionality of the operating systems. The present disclosure can also or alternatively be used with "bare-metal provisioning" for a node, to allow the node to join the cluster.

In one example embodiment, the present disclosure offloads the LCD workflow responsibilities to RAC and RAC completes the workflow using the existing ready node server bezel LCD. A new node that is added to an RAC group can be displayed in a solution cluster manager user interface. The cluster manager can be configured to automatically expand the cluster, to let a user accept or reject the node or to implement other suitable processes. The disclosed functionality can be restricted to engineered solutions only (e.g. groups of ready nodes with a predetermined configuration), such as by using a predetermined module or in other suitable manners.

The present disclosure can also or alternatively be used with multiple existing clusters. In one example embodiment, an engineered solutions can have multiple clusters for one customer, such as one cluster per business unit, one cluster per function or other suitable configurations. When the RAC of the ready node discovers multiple RAC groups, it can prompt a user to choose one of the group by scrolling through the list of groups on ready node server bezel LCD, such as by using "left" and "right" user interface controls (or "up" and "down" or other available controls), and to select the desired RAC group by pressing an "OK" button. In this manner, as few as three different user interface controls can be used to initiate the addition of a ready node to an RAC group.

At the end of the workflow, the joined group name can be displayed on the ready node server bezel LCD screen, such as to allow a user to determine which RAC cluster a server is associated with. In this manner, the present disclosure can be expanded to multiple RAC clusters at the same site.

The present disclosure can likewise be used to provide automatic updating of FW on the ready node, such as to match the FW of the cluster stack version or for other suitable purposes. A ready node as shipped from a factory could be provided with different versions of FW than what is running on other nodes in a data center, depending upon when a customer purchased an engineered solution that a new ready node is being used with or other variables. In such cases, the ready node can be updated to match with the cluster version before it is used to expand the cluster capacity, to avoid misoperation or the need for repeated restarts and other user activities.

A cluster manager of an engineered solution can be configured to update a node by staging update packages to the RAC of the node, and by then invoking the RAC applications program interface (API) to create one or more update lifecycle (LC) jobs. The most recent update packages are typically maintained at an RAC group manager, so that when a ready node joins an RAC group, the group manager can perform an update of the ready node to match with cluster stack version before making the ready node part of the group. Retrieving a version of FW from a FW server or other suitable processes can also or alternatively be used.

The present disclosure can reduce a number of reboots that are required compared to prior art methods when appliance software has to be up and running to select the right FW versions and apply them (which can require another reboot of the server). The present disclosure allows solutions to offload auto update capabilities to RAC group manager or other suitable systems or components. Without the present disclosure, different systems and components would repeat and duplicate this functionality, causing unnecessary development and validation efforts and repeated restarts and updates.

The present disclosure provides reliable and consistent update behavior across solutions for update and restart, and avoids the need for providing assistance if an operator or user performs an incorrect action or otherwise fails to follow the correct procedures. As discussed, these procedures can be complex and can create many opportunities for an operator or user to introduce an error. The present disclosure allow the complex programmable logic device (CPLD) FW, RAC FW and other suitable FW updates that require a server restart (which could trip the sequence of another restart during the update process) to be performed first and then for the rest of any FW updates to be performed normally.

FIG. 1 is a diagram of a system 100 for providing cluster formation offload using a remote access controller group manager, in accordance with an example embodiment of the present disclosure. System 100 includes cluster manager 102, remote access controllers 104, node 1 106, node N 108, ready node 110 and network 112, each of which can be implemented in hardware or a suitable combination of hardware and software.

Cluster manager 102 can be implemented as one or more algorithms operating on a processor that are configured to provide management functions for a cluster of servers. In one example embodiment, the cluster of servers can be engineered or otherwise configured to provide a complex network function, such as to provide network-attached storage for allowing data to be stored for systems and components that are attached to a network or for other suitable purposes. Cluster manager 102 can include algorithms that monitors the operations of the servers that are part of the cluster (such as by reading status data from the servers and comparing the status data to allowable ranges for the status data), their configuration (such as by periodically comparing configuration setting data to a template), their operational status (such as by monitoring responses to diagnostic controls and messages) and other parameters. Cluster manager 102 can generate user interfaces to allow users to view the data that is tracked, monitored and controlled by cluster manager 102, to allow users to modify the parameters that are monitored, the ranges for operational parameters or other suitable functions.

Remote access controllers 104 can be implemented on a CPLD, a processor or other suitable devices in combination with FW or other suitable algorithmic structures that provide, in combination, separate functionality from the operating system-related functionality of a node. In one example embodiment, remote access controllers 104 can interface with each other and cluster manager 102 even when an associated node is not powered on, and can store settings, FW and other suitable data and controls that can be used to set up and control the associated node when it is powered on. Remote access controllers 104 can interface with a display device, one or more user interface controls and other suitable devices and controls to allow a user to view sets of data, to make data selections, make functional selections and to perform other suitable functions using a remote access controller 104. Remote access controllers 104 can also be configured to allow ready node 110 to be added to an existing cluster or group, such as by automatically joining a cluster or group, by generating user interface controls that allow a user to select a cluster or group for ready node 110 to be joined to, or to perform other suitable functions that allow the remote access controller 104 of ready node 110 to select functions that will be used to configure ready node 110 for operation, so as to eliminate the need for a user to perform those functions.

Node 1 106 can be implemented on a processor or other suitable devices in combination with FW or other suitable algorithmic structures that provide server-related functionality of a node. In one embodiment, node 1 106 can provide network-attached storage functionality, such as the ability to read sets of data from data storage media, to store new sets of data to the data storage media or to perform other suitable functions. Node 1 106 can operate in a stand-alone mode, as one node of a multi-node group or cluster or in other suitable manners.

Node N 108 can be implemented on a processor or other suitable devices in combination with FW or other suitable algorithmic structures that provide server-related functionality of a node, where "N" is a positive non-zero integer greater than 1 that can represent a number of nodes in a cluster or group, a number of nodes in multiple clusters or groups or other suitable data. In one example embodiment, node N 108 can provide network-attached storage functionality, such as the ability to read sets of data from data storage media, to store new sets of data to the data storage media or to perform other suitable functions. Node N 108 can operate in a stand-alone mode, as one node of a multi-node group or cluster or in other suitable manners.

Ready node 110 can be implemented on a processor or other suitable devices in combination with FW or other suitable algorithmic structures that provide server-related functionality of a node. In one example embodiment, ready node 110 can provide network-attached storage functionality, such as the ability to read sets of data from data storage media, to store new sets of data to the data storage media or to perform other suitable functions. Ready node 110 can be provided in a configuration that allows it to operate in a stand-alone mode, and can be subsequently configured to function as one node of a multi-node group or cluster or in other suitable manners.

Network 112 can be implemented as a network data medium or media and one or more network control devices, such as network interfaces, network switches, wireless network access points, wireline network access points, optical network access points, other suitable devices or a suitable combination of those devices. Network 112 can function as a local area network, a wide area network, a sub-network, a private network or other in suitable configurations or embodiments.

In operation, system 100 allows ready node 110 to be added to a cluster or group without requiring the associated processor or processors of ready node 110 to be activated, configured for operation, used by an operator or otherwise configured for use by a user. System 100 provides minimal functionality, such as to allow a user to select a group or cluster that ready node 110 is to be added to, but automates the associated configurations, FW updates and other processes needed to integrate ready node 110 into the cluster or group.

Figure 2:
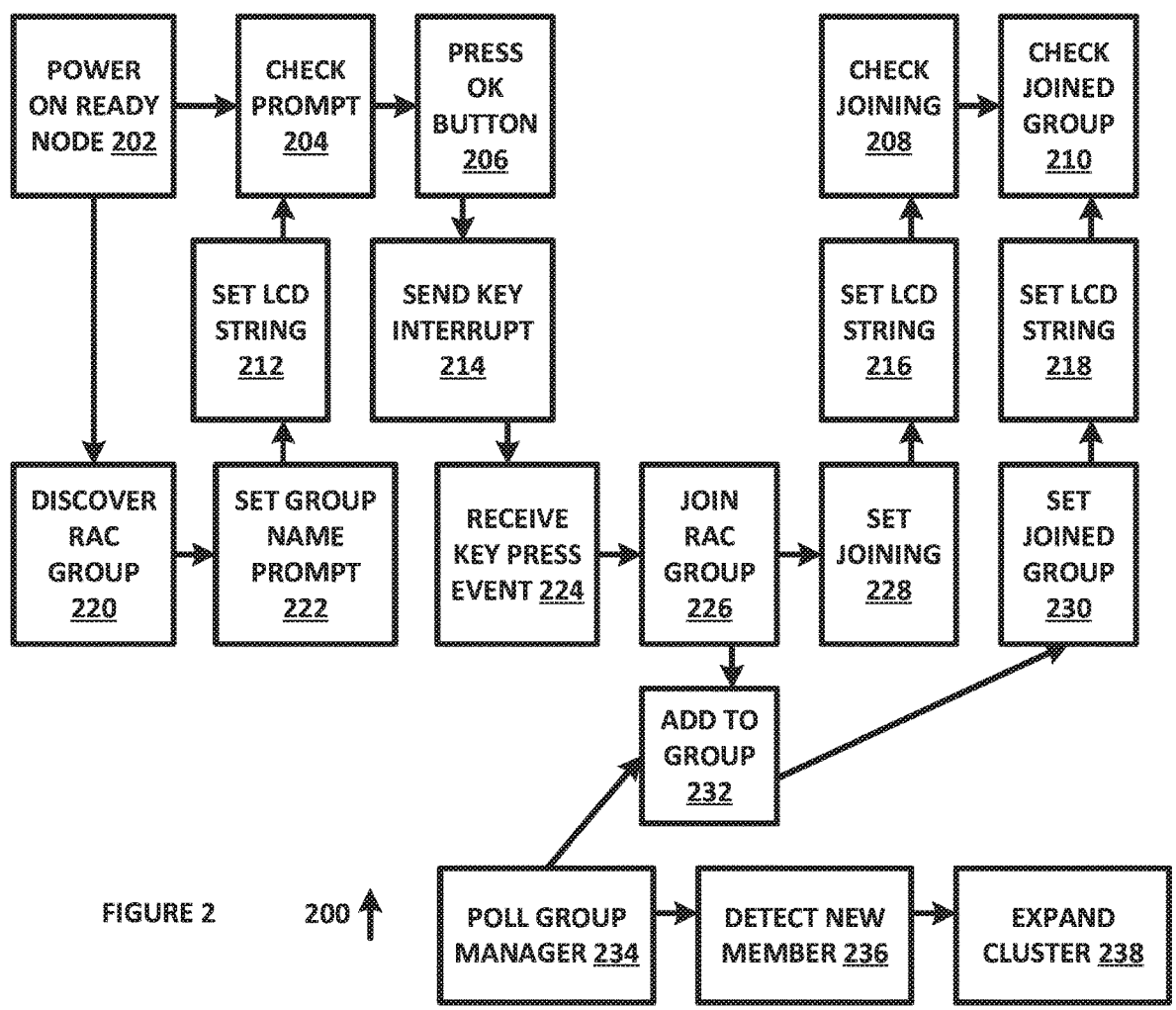
FIG. 2 is a diagram of an algorithm for providing cluster formation offload using a remote access controller group manager, in accordance with an example embodiment of the present disclosure.

FIG. 2 is a diagram of an algorithm 200 for providing cluster formation offload using a remote access controller group manager, in accordance with an example embodiment of the present disclosure. Algorithm 200 can be implemented in hardware or a suitable combination of hardware and software.

Algorithm 200 begins at 202, where a ready node is plugged in, but it does not need to be powered on. In one example embodiment, the power on can be performed at an LCD controller or in other suitable manners. The algorithm then proceeds to 204 and 220.

At 204, a prompt is checked. In one example embodiment, the prompt can be generated by first discovering a remote access control group from a ready node at 220. The remote access control group can be discovered by polling group member status data of cluster nodes, by checking a list of existing remote access control groups or other suitable processes can also or alternatively be used. The algorithm can then proceeds to 222.

At 222, a group name prompt can be set. The group name can be set by storing the group name in a variable data field at the ready node or in other suitable manners. The algorithm then proceeds to 212.

At 212, an LCD string can be set. The LCD string can be set by reading the variable data field that is holding the group name and by storing the LCD string in a variable data field of an LCD controller, or in other suitable manners. The algorithm can then proceed to 204. In an alternative embodiment, the prompt can be checked if no remote access controller groups are discovered. In one example embodiment, the prompt can be a default prompt from a default data memory that is used if no remote access controller groups are discovered, such as a prompt that states that no groups were discovered or other suitable data. The algorithm then proceeds to 206.

At 206, an OK button is pressed. In one example embodiment, the OK button can be enabled at an LCD controller so that a user actuation of the OK button after the check prompt is generated is allowed. Likewise, other suitable controls can be used, such as a restart control, an escape control and so forth. The algorithm then proceeds to 214.

At 214, a key interrupt is sent. In one example embodiment, the key interrupt can be sent from the LCD controller after user actuation of the OK button, or other suitable controls can be sent, such as a restart control, an escape control and so forth. The algorithm then proceeds to 224.

At 224, a key press event is received. In one example embodiment, the key press event can be received at the ready node or in other suitable manners. The algorithm then proceeds to 226.

At 226, a remote access control group is joined. In one example embodiment, the ready node can join the remote access control group or other suitable processes can be performed. The algorithm then proceeds to 232 and 228.

At 228, a joining is set. In one example embodiment, the joining can be set at the ready node or other suitable processes can be performed. The algorithm then proceeds to 216.

At 216, an LCD string is set. The LCD string can be set by reading the variable data field that is holding the group name and by storing the LCD string in a variable data field of an LCD controller, or in other suitable manners. The algorithm then proceeds to 208.

At 208, a joining is checked. The joining can be checked at an LCD controller, or in other suitable manners. The algorithm then proceeds to 210.

At 210, a joined group is checked. The joined group can be checked at an LCD controller, or in other suitable manners.

At 234, a group manager is polled. In one example embodiment, the group manager can be polled periodically or in other suitable manners. The algorithm then proceeds to 232 and 236.

At 236, a new member is detected. In one example embodiment, the new member can be detected at a group manager or in other suitable embodiments. The algorithm then proceeds to 238.

At 238, a cluster is expanded. In one example embodiment, the cluster can be expanded at a group manager or in other suitable embodiments.

At 232, a ready node is added to a remote access control group. In one example embodiment, the ready node can be added to a remote access control group at a group manager or in other suitable embodiments. The algorithm then proceeds to 230.

At 230, a joined group is set. In one example embodiment, the joined group can be set at a ready node or in other suitable embodiments. The algorithm then proceeds to 218.

At 218, an LCD string is set. The LCD string can be set by reading the variable data field that is holding the group name and by storing the LCD string in a variable data field of an LCD controller, or in other suitable manners. The algorithm then proceeds to 210.

In operation, algorithm 200 provides cluster formation offload using a remote access controller group manager, such as to configure a ready node or for other suitable purposes. While algorithm 200 is shown as a flow chart, it can also or alternatively be implemented as a ladder diagram, a state diagram, using objected oriented programming or in other suitable manners.

Figure 3:
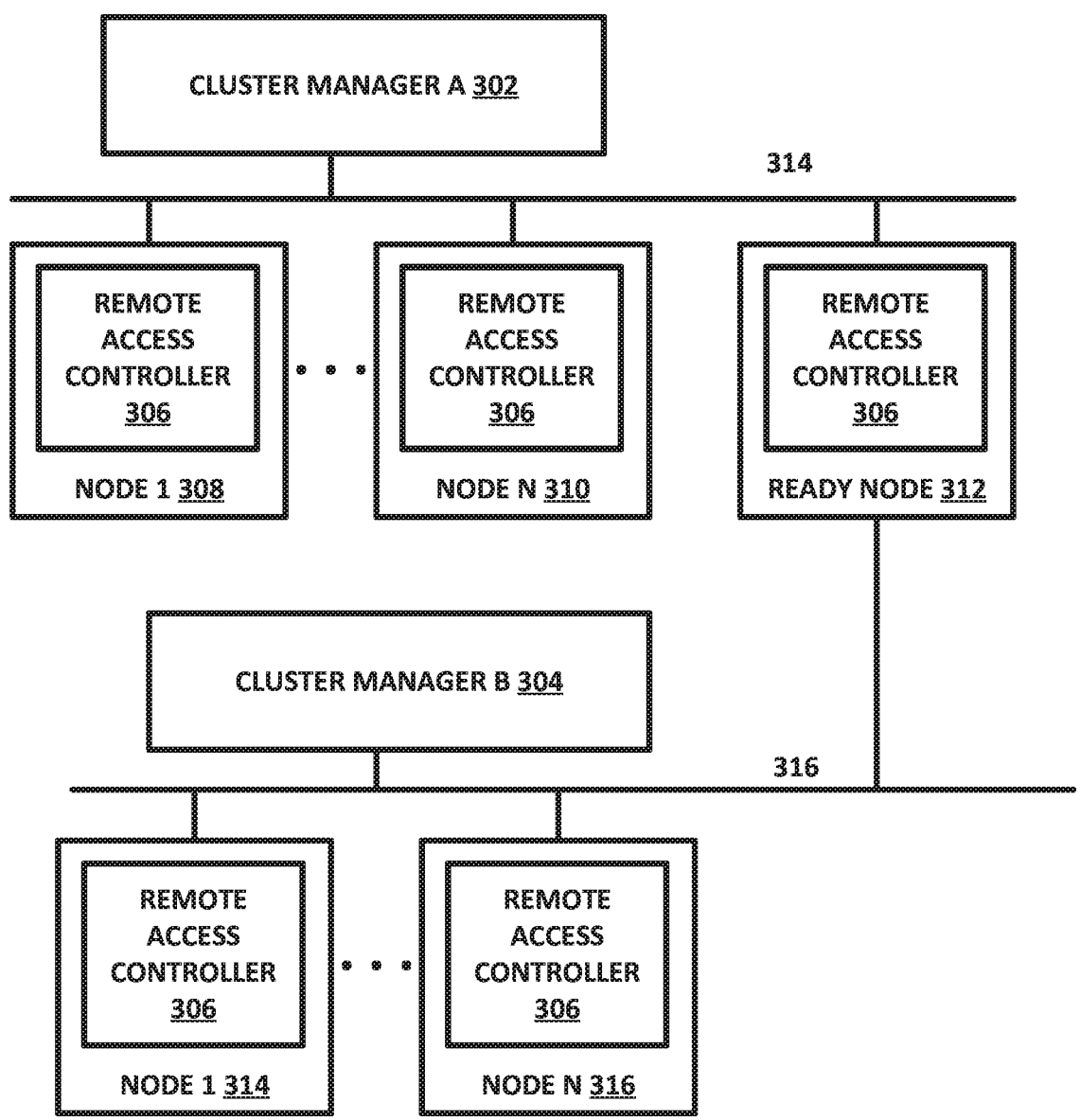
FIG. 3 is a diagram of a system for providing multiple cluster formation offload using a remote access controller group manager, in accordance with an example embodiment of the present disclosure.

FIG. 3 is a diagram of a system 300 for providing multiple cluster formation offload using a remote access controller group manager, in accordance with an example embodiment of the present disclosure. System 300 includes cluster manager A 302, cluster manager B 304, remote access controllers 306, node 1 308, node N 310, node 1 314, node N 316, ready node 312, and networks 314 and 316, each of which can be implemented in hardware or a suitable combination of hardware and software.

Cluster manager A 302 and cluster manager B 304 can each be implemented as one or more algorithms operating on a processor that are configured to provide management functions for a cluster of servers. In one example embodiment, the cluster of servers associated with each of cluster manager A 302 and cluster manager B 304 can be engineered or otherwise configured to provide a complex network function, such as to provide network-attached storage for allowing data to be stored for systems and components that are attached to a network or for other suitable purposes. Cluster manager A 302 and cluster manager B 304 can each include algorithms that monitor the operations of the servers that are part of the respective cluster (such as by reading status data from the servers and comparing the status data to allowable ranges for the status data), their configuration (such as by periodically comparing configuration setting data to a template), their operational status (such as by monitoring responses to diagnostic controls and messages) and other parameters. Cluster manager A 302 and cluster manager B 304 can each generate user interfaces to allow users to view the data that is tracked, monitored and controlled by Cluster manager A 302 and cluster manager B 304, respectively, to allow users to modify the parameters that are monitored, the ranges for operational parameters or other suitable functions.

Remote access controllers 306 can be implemented on a CPLD, a processor or other suitable devices in combination with FW or other suitable algorithmic structures that provide, in combination, separate functionality from the operating system-related functionality of a node. In one example embodiment, remote access controllers 306 can interface with each associated remote access controller 306 in their cluster and with an associated one of cluster manager A 302 and cluster manager B 304 even when an associated node is not powered on, and can store settings, FW and other suitable data and controls that can be used to set up and control the associated node when it is powered on. Remote access controllers 104 can interface with a display device, one or more user interface controls and other suitable devices and controls to allow a user to view sets of data, to make data selections, make functional selections and to perform other suitable functions using a remote access controller 104. Remote access controllers 104 can also be configured to allow ready node 110 to be added to an existing cluster or group, such as by automatically joining a cluster or group, by generating user interface controls that allow a user to select a cluster or group for ready node 110 to be joined to, or to perform other suitable functions that allow the remote access controller 104 of ready node 110 to select functions that will be used to configure ready node 110 for operation, so as to eliminate the need for a user to perform those functions.

Node 1 308 and node 1 314 can each be implemented on a processor or other suitable devices in combination with FW or other suitable algorithmic structures that provide server-related functionality of a node for an associated one of cluster manager A 302 and cluster manager B 304, respectively. In one example embodiment, node 1 308 and node 1 314 can each provide network-attached storage functionality for an associated network-attached storage cluster, such as the ability to read sets of data from data storage media, to store new sets of data to the data storage media or to perform other suitable functions. Node 1 308 and node 1 314 can each operate in a stand-alone mode, as one node of a multi-node group or cluster or in other suitable manners.

Node N 310 and node N 316 can each be implemented on a processor or other suitable devices in combination with FW or other suitable algorithmic structures that provide server-related functionality of a node, where "N" is a positive non-zero integer greater than 1 that can represent a number of nodes in a cluster or group, a number of nodes in multiple clusters or groups or other suitable data. The value of "N" associated with node N 310 can be the same as or different from the value of "N" associated with node N 316. In one example embodiment, node N 310 and node N 316 can each provide network-attached storage functionality, such as the ability to read sets of data from data storage media, to store new sets of data to the data storage media or to perform other suitable functions. Node N 310 and node N 316 can each operate in a stand-alone mode, as one node of a multi-node group or cluster or in other suitable manners.

Ready node 312 can be implemented on a processor or other suitable devices in combination with FW or other suitable algorithmic structures that provide server-related functionality of a node. In one example embodiment, ready node 312 can provide network-attached storage functionality, such as the ability to read sets of data from data storage media, to store new sets of data to the data storage media or to perform other suitable functions. Ready node 312 can be provided in a configuration that allows it to operate in a stand-alone mode, and can be subsequently configured to function as one node of a multi-node group or cluster or in other suitable manners.

Network 314 and network 316 can each be implemented as a network data medium or media and one or more network control devices, such as network interfaces, network switches, wireless network access points, wireline network access points, optical network access points, other suitable devices or a suitable combination of those devices. Network 314 and network 316 can each function as a local area network, a wide area network, a sub-network, a private network or other in suitable configurations or embodiments, either alone or in combination with each other.

In operation, system 300 allows ready node 312 to be added to a cluster or group without requiring the associated processor or processors of ready node 312 to be activated, configured for operation, used by an operator or otherwise configured for use by a user. System 300 provides minimal functionality, such as to allow a user to select a group or cluster that ready node 312 is to be added to, but automates the associated configurations, FW updates and other processes needed to integrate ready node 312 into the cluster or group.

Figure 4:
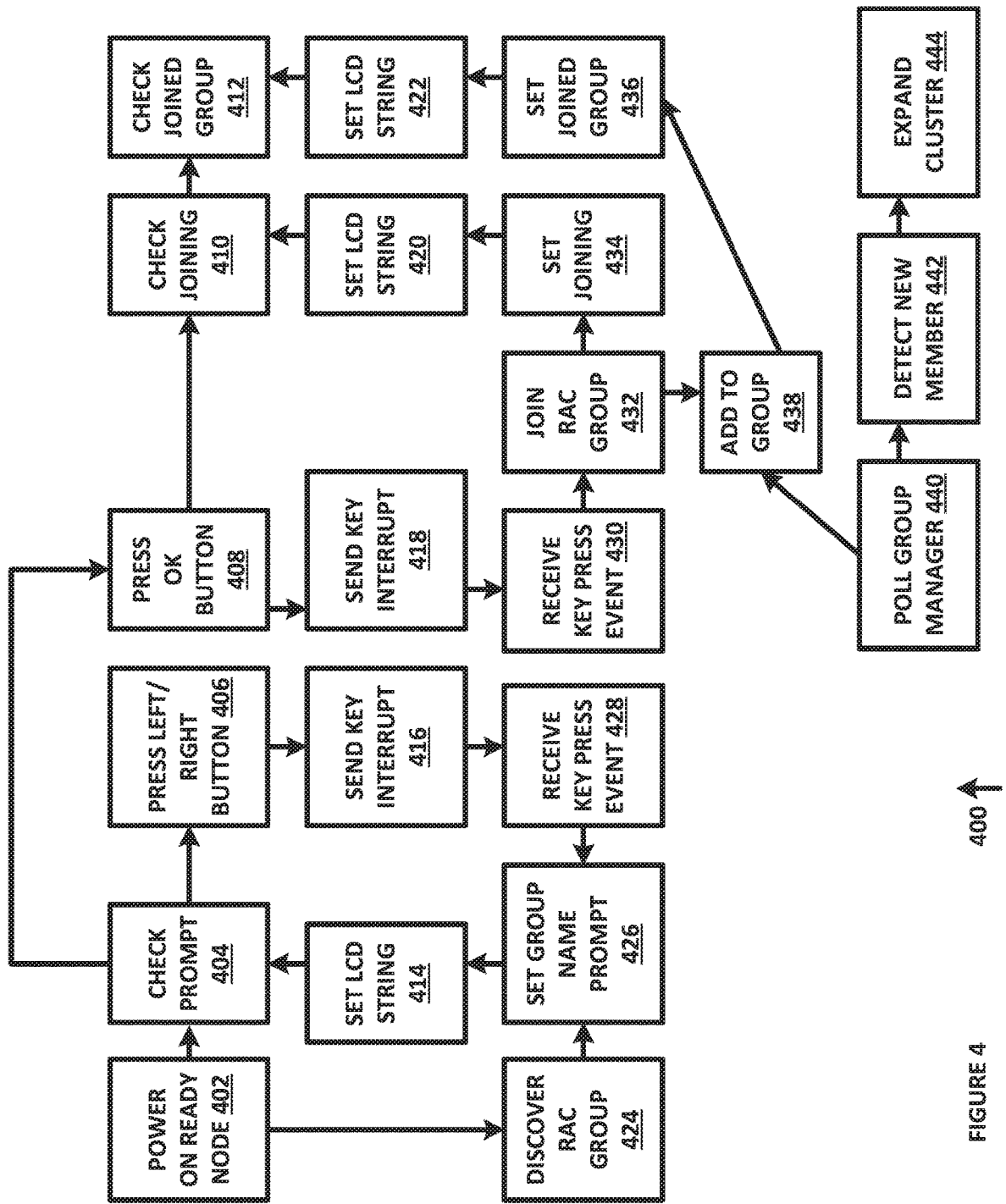
FIG. 4 is a diagram of an algorithm for providing multiple cluster formation offload using a remote access controller group manager, in accordance with an example embodiment of the present disclosure.

FIG. 4 is a diagram of an algorithm 400 for providing multiple cluster formation offload using a remote access controller group manager, in accordance with an example embodiment of the present disclosure. Algorithm 400 can be implemented in hardware or a suitable combination of hardware and software.

Algorithm 400 begins at 402, where a ready node is plugged in but not necessarily powered on. In one example embodiment, the power on can be performed at an LCD controller or in other suitable manners. The algorithm then proceeds to 404 and 424.

At 404, a prompt is checked. In one example embodiment, the prompt can be generated by first discovering a plurality of remote access control groups from a ready node at 424. The remote access control groups can be discovered by polling group member status data of cluster nodes, by checking a list of existing remote access control groups or other suitable processes can also or alternatively be used. The algorithm can then proceeds to 426.

At 426, a group name prompt can be set. The group name can be set by storing the discovered group names in a variable data field at the ready node or in other suitable manners, can inform the user that multiple groups were discovered or other suitable data can be included in the prompt.

The algorithm then proceeds to 414.

At 414, an LCD string or strings can be set. The LCD string or strings can be set by reading the variable data fields that are holding the group names and by storing the LCD strings in a variable data field of an LCD controller, or in other suitable manners. The algorithm can then proceed to 404. In an alternative embodiment, the prompt can be checked if no remote access controller groups are discovered. In one example embodiment, the prompt can be a default prompt from a default data memory that is used if no remote access controller groups are discovered, such as a prompt that states that no groups were discovered or other suitable data. The algorithm then proceeds to 406 or 408.

At 406, a left/right button is pressed. In one example embodiment, the left/right button press can be made in response to the prompt generated at 404, such as to select from a list of available groups, or in other suitable manners. Likewise, other suitable selection mechanisms can also or alternatively be used, such as an up/down button pair, an A/B button pair and so forth. The algorithm then proceeds to 416.

At 416, a key interrupt is sent. In one example embodiment, the key interrupt can be generated at an LCD display in response to the key press, or other suitable processes can also or alternatively be used. The algorithm then proceed to 428.

At 428, a key press event is received. In one example embodiment, the key press event can be received at a remote access controller of a ready node or in other suitable manners. The algorithm then proceeds to 426.

At 408, an OK button is pressed. In one example embodiment, the OK button can be enabled at an LCD controller so that a user actuation of the OK button after the check prompt is generated is allowed. Likewise, other suitable controls can be used, such as a restart control, an escape control and so forth. The algorithm then proceeds to 418.

At 418, a key interrupt is sent. In one example embodiment, the key interrupt can be sent from the LCD controller after user actuation of the OK button, or other suitable controls can be sent, such as a restart control, an escape control and so forth. The algorithm then proceeds to 430.

At 430, a key press event is received. In one example embodiment, the key press event can be received at the ready node or in other suitable manners. The algorithm then proceeds to 432.

At 432, a remote access control group is joined. In one example embodiment, the ready node can join the remote access control group or other suitable processes can be performed. The algorithm then proceeds to 438 and 434.

At 434, a joining is set. In one example embodiment, the joining can be set at the ready node or other suitable processes can be performed. The algorithm then proceeds to 420.

At 420, an LCD string is set. The LCD string can be set by reading the variable data field that is holding the group name and by storing the LCD string in a variable data field of an LCD controller, or in other suitable manners. The algorithm then proceeds to 410.

At 410, a joining is checked. The joining can be checked at an LCD controller, or in other suitable manners. The algorithm then proceeds to 412.

At 412, a joined group is checked. The joined group can be checked at an LCD controller, or in other suitable manners.

At 440, a group manager is polled. In one example embodiment, the group manager can be polled periodically or in other suitable manners. The algorithm then proceeds to 438 and 442.

At 442, a new member is detected. In one example embodiment, the new member can be detected at a group manager or in other suitable embodiments. The algorithm then proceeds to 444.

At 444, a cluster is expanded. In one example embodiment, the cluster can be expanded at a group manager or in other suitable embodiments.

At 438, a ready node is added to a remote access control group. In one example embodiment, the ready node can be added to a remote access control group at a group manager or in other suitable embodiments. The algorithm then proceeds to 436.

At 436, a joined group is set. In one example embodiment, the joined group can be set at a ready node or in other suitable embodiments. The algorithm then proceeds to 422.

At 422, an LCD string is set. The LCD string can be set by reading the variable data field that is holding the group name and by storing the LCD string in a variable data field of an LCD controller, or in other suitable manners. The algorithm then proceeds to 412.

In operation, algorithm 400 provides multiple cluster formation offload using a remote access controller group manager, such as to configure a ready node or for other suitable purposes. While algorithm 400 is shown as a flow chart, it can also or alternatively be implemented as a ladder diagram, a state diagram, using objected oriented programming or in other suitable manners.

Figure 5:
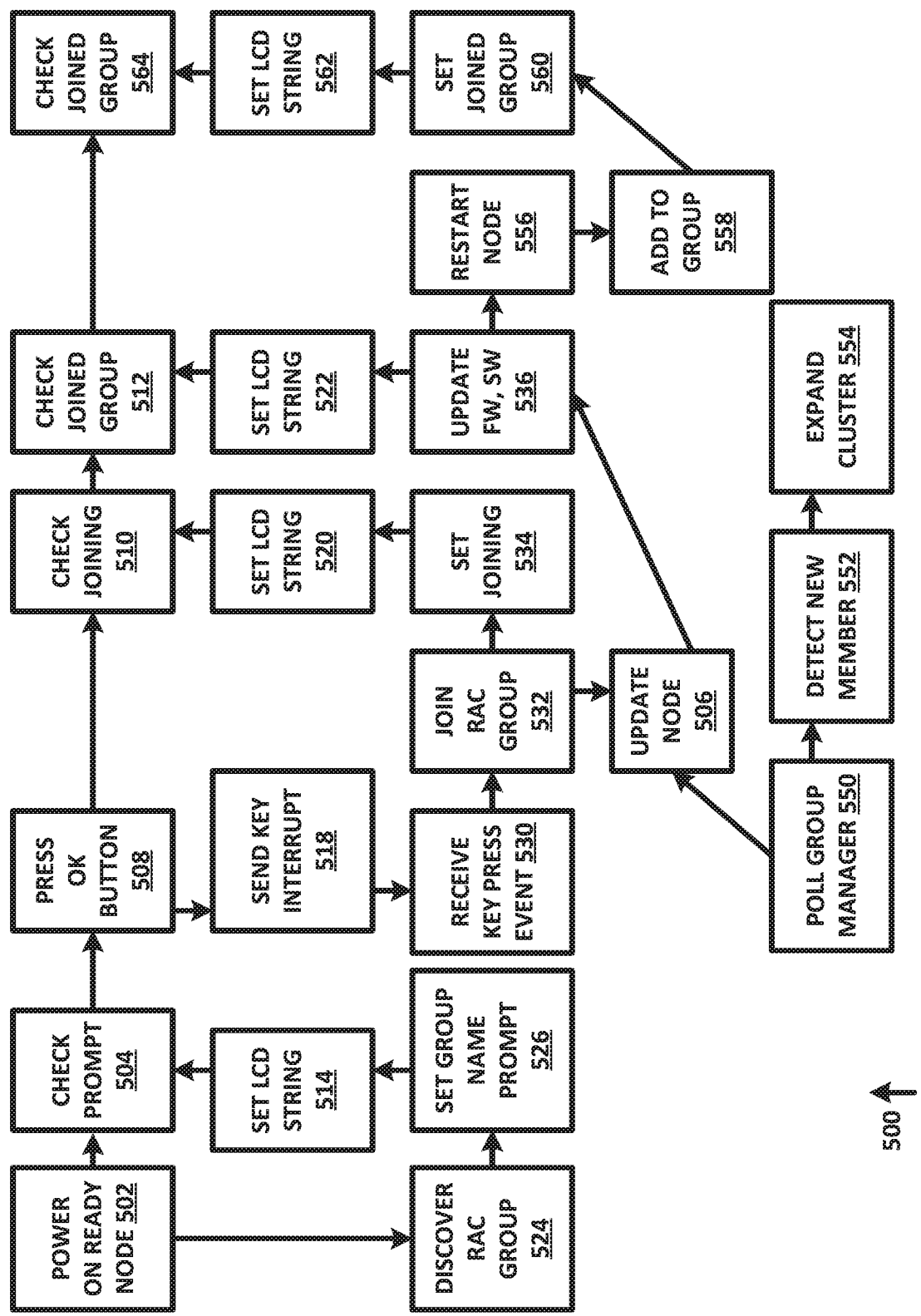
FIG. 5 is a diagram of an algorithm for providing automatic cluster formation offload using a remote access controller group manager, in accordance with an example embodiment of the present disclosure.

FIG. 5 is a diagram of an algorithm 500 for providing automatic cluster formation offload using a remote access controller group manager, in accordance with an example embodiment of the present disclosure. Algorithm 500 can be implemented in hardware or a suitable combination of hardware and software.

Algorithm 500 begins at 502, where a ready node is powered on. In one example embodiment, the power on can be performed at an LCD controller or in other suitable manners. The algorithm then proceeds to 504 and 524.

At 504, a prompt is checked. In one example embodiment, the prompt can be generated by first discovering a remote access control group from a ready node at 524. The remote access control group can be discovered by polling group member status data of cluster nodes, by checking a list of existing remote access control groups or other suitable processes can also or alternatively be used. The algorithm can then proceed to 526.

At 526, a group name prompt can be set. The group name can be set by storing the group name in a variable data field at the ready node or in other suitable manners. The algorithm then proceeds to 514.

At 514, an LCD string can be set. The LCD string can be set by reading the variable data field that is holding the group name and by storing the LCD string in a variable data field of an LCD controller, or in other suitable manners. The algorithm can then proceed to 504. In an alternative embodiment, the prompt can be checked if no remote access controller groups are discovered. In one example embodiment, the prompt can be a default prompt from a default data memory that is used if no remote access controller groups are discovered, such as a prompt that states that no groups were discovered or other suitable data. The algorithm then proceeds to 508.

At 508, an OK button is pressed. In one example embodiment, the OK button can be enabled at an LCD controller so that a user actuation of the OK button after the check prompt is generated is allowed. Likewise, other suitable controls can be used, such as a restart control, an escape control and so forth. The algorithm then proceeds to 518.

At 518, a key interrupt is sent. In one example embodiment, the key interrupt can be sent from the LCD controller after user actuation of the OK button, or other suitable controls can be sent, such as a restart control, an escape control and so forth. The algorithm then proceeds to 530.

At 530, a key press event is received. In one example embodiment, the key press event can be received at the ready node or in other suitable manners. The algorithm then proceeds to 532.

At 532, a remote access control group is joined. In one example embodiment, the ready node can join the remote access control group or other suitable processes can be performed. The algorithm then proceeds to 506 and 534.

At 534, a joining is set. In one example embodiment, the joining can be set at the ready node or other suitable processes can be performed. The algorithm then proceeds to 520.

At 520, an LCD string is set. The LCD string can be set by reading the variable data field that is holding the group name and by storing the LCD string in a variable data field of an LCD controller, or in other suitable manners. The algorithm then proceeds to 510.

At 510, a joining is checked. The joining can be checked at an LCD controller, or in other suitable manners. The algorithm then proceeds to 512.

At 512, a joined group is checked. The joined group can be checked at an LCD controller, or in other suitable manners. The algorithm then proceeds to 564.

At 550, a group manager is polled. In one example embodiment, the group manager can be polled periodically or in other suitable manners. The algorithm then proceeds to 506 and 534.

At 506, a node is updated. In one example embodiment, the node can be updated by a cluster group manager or using other suitable systems or processes, such as to update a ready node to enable it to join a group. The algorithm then proceeds to 536.

At 536, firmware and software is updated at a ready node. In one example embodiment, the firmware and software can be updated from the cluster group manager, by causing the ready node to initiate an update process or in other suitable manners. The algorithm then proceeds to 522.

At 522, an LCD string is set. The LCD string can be set by reading the variable data field that is holding the group name and by storing the LCD string in a variable data field of an LCD controller, or in other suitable manners. The algorithm then proceeds to 512.

At 552, a new member is detected. In one example embodiment, the new member can be detected at a group manager or in other suitable embodiments. The algorithm then proceeds to 554.

At 554, a cluster is expanded. In one example embodiment, the cluster can be expanded at a group manager or in other suitable embodiments.

At 558, a ready node is added to a remote access control group. In one example embodiment, the ready node can be added to a remote access control group at a group manager or in other suitable embodiments. The algorithm then proceeds to 560.

At 560, a joined group is set. In one example embodiment, the joined group can be set at a ready node or in other suitable embodiments. The algorithm then proceeds to 562.

At 562, an LCD string is set. The LCD string can be set by reading the variable data field that is holding the group name and by storing the LCD string in a variable data field of an LCD controller, or in other suitable manners. The algorithm then proceeds to 564.

In operation, algorithm 500 provides automatic cluster formation offload using a remote access controller group manager, such as to configure a ready node or for other suitable purposes. While algorithm 500 is shown as a flow chart, it can also or alternatively be implemented as a ladder diagram, a state diagram, using objected oriented programming or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processor configuration comprising:
a processor that includes a plurality of algorithmic controls stored in memory and configured to cause the processor to perform predetermined functions;
a remote access controller coupled to the processor and configured to communicate over a communications medium and to send and receive controls and data to a remote device; and
wherein the remote access controller is further configured to detect two or more server groups over the communications medium, to generate a prompt on a user interface device of the remote access controller to allow a user to select a control from a liquid crystal display (LCD) at the processor for the processor to be configured to join one of the two or more server groups when the processor transitions from a power off state to a power on state, to receive a user selection of the prompt, to generate a name of a second server group at the LCD, to receiver a response to an OK control from the LCD, to update a node associated with the processor at a server group manager for the second server group, to update firmware at the processor with the server group manager and to generate a display at the LCD of a name of the second server group.

2. The system of claim 1 wherein the communications medium is a network and at least one of the server groups is configured to function as a coordinated system over the network.

3. The system of claim 1 wherein the communications medium is a network and at least one of the server groups is configured to function as a network attached storage system over the network.

4. The system of claim 1 wherein the remote access controller is configured to generate a user prompt to allow a user to select one of two or more server groups.

5. The system of claim 1 wherein the remote access controller is configured to receive additional algorithmic controls over the communications medium from the server group manager.

6. The system of claim 1 wherein the remote access controller is configured to receive additional algorithmic controls over the communications medium from the server group manager in response to the selection of the control for the processor to be configured to join the one of the server groups.

7. The system of claim 1 wherein the remote access controller is configured to communicate over the communications medium and to send and receive controls and data to the remote device when the processor is in the power off state.

8. The system of claim 1 wherein the remote access controller is configured to communicate over the communications medium and to send and receive controls and data to the remote device when the processor is in a power off mode and to set one or more variables to cause the processor to be configured to join the selected server group when the processor transitions from the power off state to the power on state.

9. The system of claim 1 wherein the remote access controller is further configured to detect a firmware update and to install the firmware update when the processor transitions from the power off state to the power on state.

10. A method for processor configuration comprising:
storing a plurality of algorithmic controls in a memory of a processor that cause the processor to perform predetermined functions;
detecting two or more server groups over a communications medium using a remote access controller coupled to the processor when the processor is in a power off state by interfacing with a remote device;
generating a prompt on a liquid crystal display (LCD) user interface device of the remote access controller that identifies a selected one of the server groups to allow a user to select a control for the processor to be configured to join the selected one of the server groups when the processor transitions from a power off state to a power on state;
receiving a user selection of the prompt at the remote device;
generating a name of a second server group at the LCD;
receiving a response to an OK control from the LCD;
updating a node associated with the processor at a server group manager for the second server group;
updating firmware at the processor with the server group manager; and
generating a display at the LCD of a name of the second server group.

11. The method of claim 10 wherein the communications medium is a network and at least one of the server groups functions as a coordinated system over the network.

12. The method of claim 10 wherein the communications medium is a network and at least one of the server groups functions as a network attached storage system over the network.

13. The method of claim 10 wherein the remote access controller generates a user prompt to allow a user to select one of two or more server groups.

14. The method of claim 10 wherein the remote access controller receives additional algorithmic controls over the communications medium from the server group manager.

15. The method of claim 10 wherein the remote access controller receives additional algorithmic controls over the communications medium from the server group manager in response to the selection of the control for the processor to be configured to join the one of the server groups.

16. The method of claim 10 wherein the remote access controller communicates over the communications medium and sends and receives controls and data with the remote device when the processor is in the power off state.

17. The method of claim 10 wherein the remote access controller communicates over the communications medium to send and receive controls and data with the remote device when the processor is in a power off mode and to set one or more variables to cause the processor to be configured to join the selected server group when the processor transitions from the power off state to the power on state.

18. The method of claim 10 wherein the remote access controller detects a firmware update and installs the firmware update when the processor transitions from the power off state to the power on state.

19. The method of claim 10 further comprising:
receiving a user selection of the prompt at the remote device;
generating a name of a second server group at the LCD;
updating a node associated with the processor at the server group manager for the second server group; and
updating firmware at the processor with the server group manager.

* * * * *